United States Patent
Schramm et al.

[11] Patent Number: 6,053,038
[45] Date of Patent: Apr. 25, 2000

[54] INTERNAL-TO-VEHICLE MECHANISM FOR MONITORING THE AIR PRESSURE OF A TIRE OF A VEHICLE

[76] Inventors: Herbert Schramm, Tilgshausenstr 47/1, 71229 Leonberg; Dieter Woerner, Doernle 2, 75031 Eppingen; Dagobert Masur, Franz-Schubert-Weg 6, 70806 Kornwestheim, all of Germany

[21] Appl. No.: 08/972,386

[22] Filed: Nov. 18, 1997

[30] Foreign Application Priority Data

Nov. 28, 1996 [DE] Germany .......................... 196 49 277

[51] Int. Cl.⁷ .................................................. B60C 23/02

[52] U.S. Cl. ............................................................ 73/146.5

[58] Field of Search ................................ 73/146.2, 146.3, 73/146.5, 708; 200/61.22, 61.25; 340/442, 443, 444, 445, 446, 447, 448

[56] References Cited

U.S. PATENT DOCUMENTS

| | | | |
|---|---|---|---|
| 4,749,993 | 6/1988 | Szabo et al. | 73/146.5 |
| 4,891,973 | 1/1990 | Bollweber et al. | 340/448 |
| 4,966,034 | 10/1990 | Bock et al. | 73/146.5 |
| 5,301,553 | 4/1994 | Schultz et al. | 73/146.5 |
| 5,559,484 | 9/1996 | Nowicki et al. | 73/146.5 |
| 5,600,301 | 2/1997 | Robinson, III | 340/442 |

*Primary Examiner*—William Oen

[57] ABSTRACT

An internal-to-vehicle mechanism for monitoring the air pressure of a tire of a vehicle includes a sensor, detecting the tire pressure, which rotates, together with an electrotechnical first device, synchronously with the wheel and which, as a function of the tire air pressure that is determined, modifies parameters of the first device, namely the energy uptake of the first device. A stationary electrotechnical second device radiates an electric and/or magnetic, in particular electromagnetic, field through which the first device passes at, preferably, each wheel rotation with an uptake of energy from the field. A monitoring device detects the energy uptake and/or energy release of the second device.

11 Claims, 2 Drawing Sheets

INTERNAL-TO-VEHICLE MECHANISM FOR MONITORING THE AIR PRESSURE OF A TIRE OF A VEHICLE

BACKGROUND INFORMATION

It is known to use internal-to-vehicle mechanisms for monitoring the air pressure of the tires of a vehicle. These mechanisms have a stationary device which interacts with a device that co-moves with the respective wheel of the vehicle in such a way that monitoring of the air pressure can take place during operation of the vehicle. The co-moving device uses suitable means to sense the air pressure, and transmits an output-related signal to the stationary device if the air pressure falls below a certain value. A prerequisite for operation of these systems is that the co-moving device have an energy supply, for example a small battery rotating along with the wheel being monitored. This configuration must therefore be included in ongoing maintenance cycles so that a battery exchange is performed at the proper time. The battery exchange leads to additional costs. Moreover, the mass of the rotating wheel is influenced by the requisite battery device; in particular, an asymmetrical mass distribution results, which requires additional counterweights. Overall wheel balance is therefore degraded.

SUMMARY OF THE INVENTION

The internal-to-vehicle mechanism according to the present invention includes a sensor, detecting the tire pressure, which rotates, together with an electrotechnical first device, synchronously with the wheel and which, as a function of the tire air pressure that is determined, modifies parameters of the first device, namely the energy uptake of the first device, such that a stationary electrotechnical second device is provided which radiates an electric and/or magnetic, in particular electromagnetic, field through which the first device passes at, preferably, each wheel rotation with an uptake of energy from the field; and such that a monitoring device which detects the energy uptake and/or energy release of the second device is provided.

This configuration according to the present invention does not require separate co-moving energy sources on the side that moves, i.e. rotates with the tires, since energy is supplied to the first device via the electric and/or magnetic, preferably electromagnetic, field. The energy uptake of the first device depends on the tire air pressure determined by the sensor, i.e. if the tire air pressure changes beyond a certain value and/or drops below a defined value, the sensor affects certain parameters of the first device in such a way that the energy uptake of the device changes. Consequently more or less energy is withdrawn from the supplying field, i.e. an effect is perceptible on the stationary side of the overall arrangement, since the energy to be applied to establish the supplying field becomes greater or less as a function of the energy withdrawal of the first device. The level of field energy released or the energy uptake of the second device, which depends on the field energy withdrawn, thus constitutes an indication of the energy required by the first device, which—as shown—depends on the tire air pressure.

According to the present invention, a conclusion can therefore be drawn, from the non-co-rotating side of the overall arrangement, as to the state of the tire pressure in the tire, this conclusion being drawn by an electronic monitoring device which, for example if the tire air pressure falls below a minimum value, issues a warning to the vehicle driver, for example an optical and/or acoustical signal. It is possible to monitor all the tires of a vehicle separately in each case and provide an individual display for each tire, or to perform tire pressure monitoring which occurs individually at each tire but nevertheless leads globally only to a unified alarm signal, i.e. after perceiving the warning signal the vehicle driver must determine which of the tires has caused the alarm to be triggered. It is also possible, within the framework of the present invention, for an alarm to be issued to the driver, alternatively or additionally, if a certain change in air pressure occurs, in particular within a certain period of time.

According to the present invention, provision is made for the sensor to be configured as a temperature-compensated sensor. This configuration prevents weather-related and seasonal temperature changes, which affect air pressure, from leading to a false alarm with regard to tire pressure.

Provision is further made for the sensor to have a threshold value switch which switches as a function of tire air pressure. The threshold value switch changes its switching state as soon as a deviation in tire pressure from a defined setpoint occurs. Switching causes the previously mentioned energy-uptake-related parameters of the first electrical device to change; this is detected by the stationary part of the overall electronic system and analyzed accordingly.

It is further advantageous if the first device has an electrical oscillator circuit that interacts with the field. The oscillator circuit oscillates in normal circumstances, i.e. when the relevant tire is at its normal tire pressure, at a certain frequency. The energy required for the oscillation process is withdrawn from the field supplied by the second device. If the tire air pressure assumes an impermissible value, this is detected by the sensor, which modifies the electrical parameters of the oscillator circuit and thus its energy uptake. For example, the threshold value switch switches, and modifies the resonant frequency of the oscillator circuit or, for example, switches it off. The consequence is always a change in energy uptake, which is sensed by the second, stationary device. The oscillator circuit can be configured as a high-frequency or a low-frequency oscillator circuit.

Preferably, the sensor and/or the first device is mounted on a rim carrying the tire, for example, on the inner edge of the rim. The sensor and first device consequently co-move with the tire being monitored. Provision can be made, in particular, for the sensor and/or the first device to be arranged on a pulse wheel/pulse ring of an antilock braking system (ABS) device rotating synchronously with the tire. The pulse wheel or pulse ring thus performs a dual function, since on the one hand it transmits information to the antilock braking system device regarding the rotation speed of the wheel/tire, and on the other hand the pulse wheel or pulse ring serves as a mounting point for the sensor and/or first device.

It is particularly preferred if the second device is configured as a rotation speed sensor of the ABS device, or has the rotation speed sensor. The ABS device can, as a result, be used for a dual function, since on the one hand it performs its usual monitoring activity with regard to slippage, etc., and in this manner guarantees a safe and reliable braking distance; but on the other hand it is also used for the purposes of the present invention, since the rotation speed sensor acting for the ABS device at the same time constitutes the element which emits the electric or magnetic or electromagnetic field which makes available the energy being supplied to the first device. The arrangement is preferably such that the rotation speed sensor is an oscillator circuit arrangement which is influenced by means of metal teeth of the pulse wheel, so that by counting the teeth, and by means of a knowledge of the number of teeth on the pulse wheel, the rotation speed sensor receives information regarding the wheel rotation speed. The electrical signal at the rotation speed sensor thus changes in synchrony with the teeth or tooth gaps of the pulse wheel. Since, as mentioned, the rotation speed sensor represents an oscillator circuit, it is at the same time capable of establishing the field in order to make available to the first, co-rotating device the energy that is needed for the oscillator circuit acting there.

If the electrical parameters of the oscillator circuit of the first device are modified because the tire air pressure assumes an impermissible value, more or less energy is correspondingly demanded of the rotation speed sensor of the stationary device in order to establish the field, so that the ABS signal emitted by the rotation speed sensor remains fundamentally the same, but assumes a different level, for example is present at a higher voltage level or at a lower voltage level depending on whether the parameter modifications in the first device result in a higher or a lower energy uptake. It is, of course, also possible for the parameter modifications to be what results in any energy uptake at all by the first device, or to deactivate the energy uptake. An additional component for generating the field is consequently not required in order to implement the tire air pressure monitoring system according to the present invention, since the components already used for the ABS device can also be utilized.

If higher field strengths are needed for the transmission principle according to the present invention with a high-frequency oscillator circuit, an additional high-frequency (HF) oscillator is necessary in addition to the rotation speed sensor; the HF oscillator and rotation speed sensor can be located in a shared housing. This leads to an integrated module. If a low-frequency (LF) variant is implemented, the existing rotation speed sensor for the ABS device can be used for the dual function explained above, resulting in a particularly simple and economical solution.

DETAILED DESCRIPTION

Figure 1:
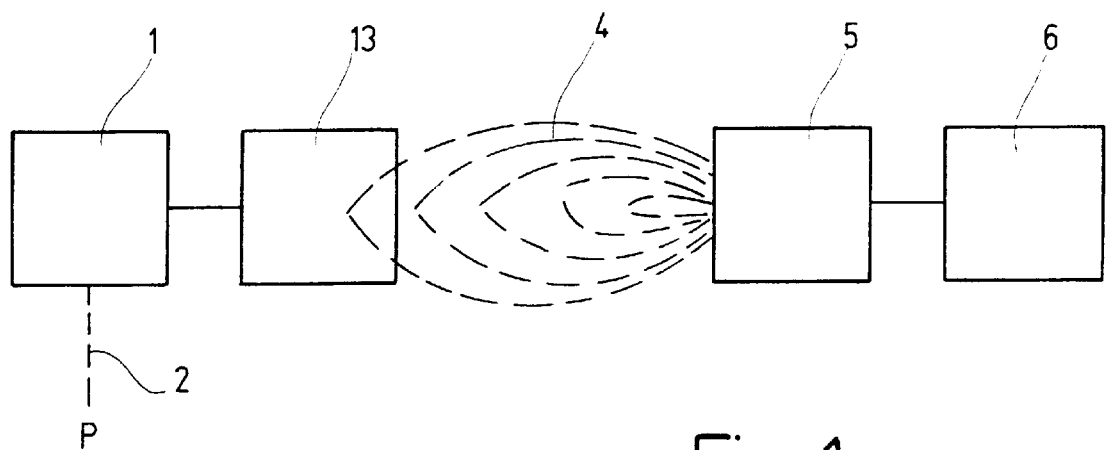
FIG. 1 shows a block diagram of the internal-to-vehicle mechanism according to the present invention.

FIG. 1 shows a sensor 1 that, via an effective connection 2, monitors the tire pressure p of a tire (not further depicted) of a vehicle. If the air pressure changes in such a way that sensor 1 responds, it transmits this fact to an electrotechnical first device 3. First device 3 is configured as an oscillator circuit, or has an oscillator circuit, that possesses a certain natural frequency. Since the exact design of the oscillator circuit is known to anyone skilled in the art and can accordingly also be varied, the circuit will not be discussed in detail in the course of further explanations. The response of sensor 1 changes the oscillation frequency of the oscillator circuit of first device 3, or the oscillator circuit is switched on or off by the sensor response. In any event, the sensor response results in a change in state of the oscillator circuit which is expressed by the fact that the uptake of electrical energy of first device 3 changes. The aforementioned energy that must be made available for operation of the oscillator circuit of first device 3 is withdrawn from an electric and/or magnetic, or electromagnetic, field 4 that is radiated by a stationary electrotechnical second device 5. Device 5 is thus located on the chassis or the like of the vehicle, and therefore does not co-move with the tire. Rather the arrangement is such that the first device always moves through field 4 once during one wheel rotation, so that an interaction is possible at each rotation of the wheel.

Since a modification in the electrical parameters of first device leads to a modification in energy uptake—i.e. more or less energy is withdrawn from field 4—this evokes a corresponding change in state of the second device, i.e. the latter must correspondingly make available more or less energy for establishment of the field. This modification is sensed by a monitoring device 6 which, as a result of the change in state just explained, is capable of drawing a conclusion as to tire air pressure, since the change in state was triggered by a response by sensor 1, i.e. by a change in tire air pressure or by the sensing of a certain tire air pressure.

Since first device 3 and sensor 1 withdraw the energy required for operation from electric field 4, no additional energy source is required, i.e. no special energy source that co-rotates with the tire being monitored. This eliminates maintenance operations which are necessary, in the case of mechanisms according to the existing art, in order to change batteries. The solution is moreover particularly environmentally friendly, since no used batteries are generated.

It is particularly advantageous if the second device is a rotation speed sensor of an ABS device that interacts with a pulse ring (pulse wheel) 7 which rotates synchronously along with the vehicle wheel being monitored.

Figure 3:
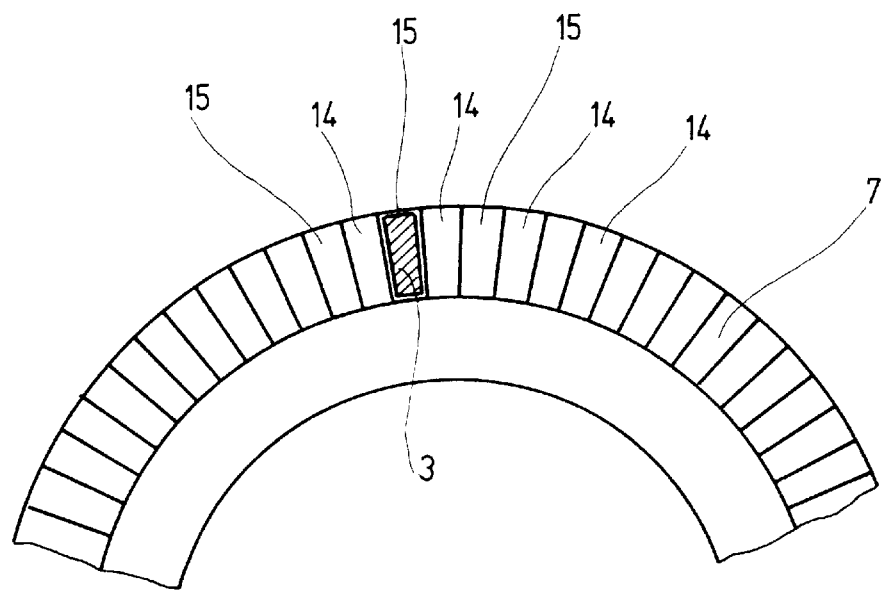
FIG. 3 shows a plan view of a pulse ring that occupies a portion of the mechanism according to the present invention.
Figure 2:
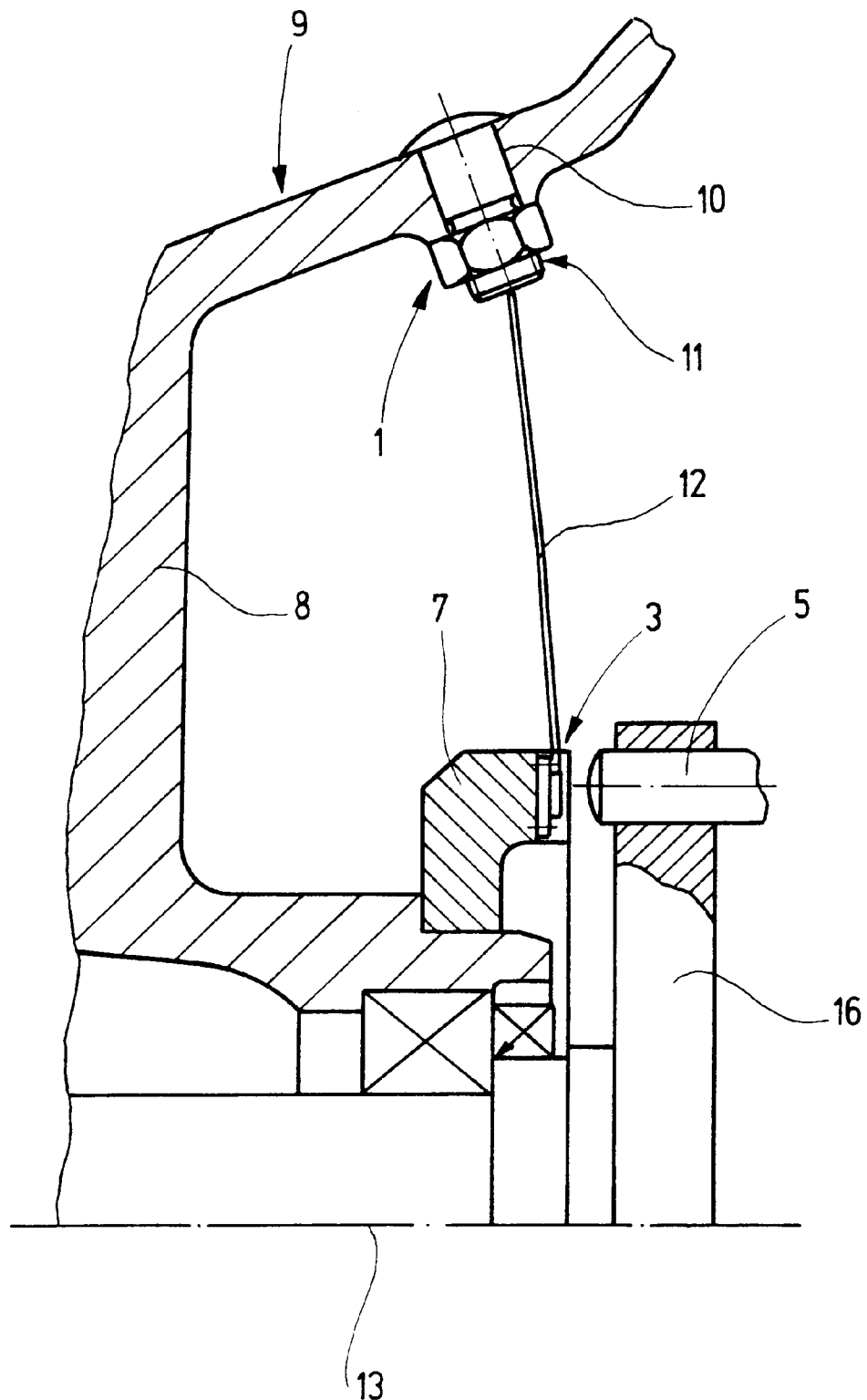
FIG. 2 shows a sectioned view in the vicinity of the tire.

FIG. 2 shows a configuration of this kind equipped with an ABS device. Passing through rim 8 of a tire 9 (not depicted) of the vehicle (not depicted) is a hole 10 which leads into the interior of the tire. The hole is in communication with sensor 1, i.e. sensor 1 senses the tire air pressure. Sensor 1, which is configured in particular as a temperature-compensated sensor, can operate as a threshold value switch 11 which switches when the tire air pressure falls below a defined value and/or when a defined value is exceeded. Switching causes changes in other electrical parameters, which are conveyed via an electrical line 12 to first electrotechnical device 3. The first device is located on pulse ring 7, which is mounted nonrotatably on the hub of rim 8. The rotation axis of wheel 9 is assigned the reference character 13 in FIG. 2. The construction of pulse ring 7 is evident on the one hand from FIG. 2 and also, on the other hand, from FIG. 3. It is apparent that it has a plurality of metal teeth 14 between which tooth gaps 15 are configured. As is evident from FIG. 3, one of tooth gaps 15 is occupied by first device 3, by the fact that it is, for example, adhesively bonded or held with corresponding mounting means therein.

As FIG. 2 shows, teeth 14 or tooth gaps 15 of pulse ring are located opposite second device 5, which is carried in stationary fashion by a holder 16 of the vehicle chassis. The electric field emitted by second device 5 can consequently, when a wheel rotation occurs, always interact with first device 3 in the manner already described above.

In a particularly preferred fashion, provision is made for monitoring device 6 not to be a separate monitoring unit for monitoring tire air pressure, but for it to be the ABS control unit which simply performs an additional function, i.e. as previously explained, the function of monitoring the tire air pressure, which is possible because a change in the level of the transmitted signals occurs as soon as sensor 1 responds.

What is claimed is:

1. An internal-to-vehicle mechanism for monitoring an air pressure of a tire of a vehicle, comprising:

an electrotechnical first device;

a sensor detecting the tire air pressure, the sensor rotating, together with the first device, synchronously with a wheel of a vehicle, the sensor modifying at least one of a first magnetic field energy uptake and a first electromagnetic field energy uptake of the first device as a function of the detected tire air pressure;

a stationary electrotechnical second device radiating an electromagnetic field, the first device passing through the electromagnetic field; and a monitoring device coupled to the second device and for detecting at least one of a second energy uptake and an energy release relating to a second energy of the second device, wherein the second energy is used to build up at least one of a magnetic field and the electromagnetic field, and wherein at least one of the sensor and the first device is adapted to being arranged on a pulse ring of an antilock braking system device rotating synchronously with the tire.

2. The mechanism according to claim 1, wherein the first device passes through the electromagnetic field at each rotation of the wheel with an uptake of energy from the electromagnetic field.

3. The mechanism according to claim 1, wherein the sensor is a temperature-compensated sensor.

4. The mechanism according to claim 1, wherein the sensor includes a threshold value switch in communication with the first device, the switch switching as a function of the tire air pressure.

5. The mechanism according to claim 1, wherein the first device includes an electrical oscillator circuit in communication with the sensor and interacting with the electromagnetic field.

6. The mechanism according to claim 5, wherein the oscillator circuit is a high-frequency oscillator circuit.

7. The mechanism according to claim 5, wherein the oscillator circuit is a low-frequency oscillator circuit.

8. The mechanism according to claim 1, wherein at least one of the sensor and the first device is mounted on a rim carrying the tire.

9. The mechanism according to claim 1, wherein the second device includes a rotation speed sensor of an antilock braking system, the rotation speed sensor interacting with the pulse ring of the antilock braking system.

10. An internal-to-vehicle mechanism for monitoring an air pressure of a tire of a vehicle, comprising:

an electrotechnical first device;

a sensor detecting the tire air pressure, the sensor rotating, together with the first device, synchronously with a wheel of a vehicle, the sensor modifying at least one of a first magnetic field energy uptake and a first electromagnetic field energy uptake of the first device as a function of the detected tire air pressure;

a stationary electrotechnical second device radiating an electromagnetic field, the first device passing through the electromagnetic field;

a monitoring device coupled to the second device and for detecting at least one of a second energy uptake and an energy release relating to a second energy of the second device, wherein the second energy is used to build up at least one of a magnetic field and the electromagnetic field; and a pulse ring of an antilock braking system, wherein at least one of the sensor and the first device is arranged on the pulse ring.

11. An internal-to-vehicle mechanism for monitoring an air pressure of a tire of a vehicle, comprising:

an electrotechnical first device;

a sensor detecting the tire air pressure, the sensor rotating, together with the first device, synchronously with a wheel of a vehicle, the sensor modifying at least one of a first magnetic field energy uptake and a first electromagnetic field energy uptake of the first device as a function of the detected tire air pressure;

a stationary electrotechnical second device radiating an electromagnetic field, the first device passing through the electromagnetic field;

a monitoring device coupled to the second device and for detecting at least one of a second energy uptake and an energy release relating to a second energy of the second device, wherein the second energy is used to build up at least one of a magnetic field and the electromagnetic field; and a pulse ring of an antilock braking system, wherein at least one of the sensor and the first device is arranged on the pulse ring, wherein:

the pulse ring includes a plurality of metal teeth separated from each other by an associated one of a plurality of tooth gaps, and the first device occupies one of the plurality of tooth gaps.

* * * * *